3,234,269
9-B-HOMO-19-NORSTEROIDS AND
PREPARATION THEREOF
Oskar Jeger and Kurt Schaffner, Zurich, Switzerland, assignors to Ciba Corporation, New York, N.Y., a corporation of Delaware
No Drawing. Filed Nov. 6, 1962, Ser. No. 235,825
Claims priority, application Switzerland, Nov. 9, 1961, 12,990/61
9 Claims. (Cl. 260—488)

The present invention provides new homosteroids and a process for their manufacture. The new homosteroids are distinguished by the fact that in them the carbon atom of the 19-methyl group is a member of an extended ring B and the original bond between the carbon atoms 9 and 10 is split up. They may, therefore, be looked upon as 9:10-seco-9:19-cyclosteroids or as 9-B-homo-19-norsteroids.

The new compounds are obtained by treating a 9β:19-cycle-11-oxosteroid with an acid, whereupon if desired, in the resulting 9-B-homo-19-norsteroid the 11-oxo group is reduced to the 11-hydroxyl group, or eliminated under reducing conditions, in known manner.

The splitting up of the cyclopropane ring with formation of a 7-membered B-ring according to the invention is accompanied by formation of a double bond which, in the presence of a 3-oxo group, migrates into the 4:5-position. The reaction described in Example 1 can be represented by the following formulae

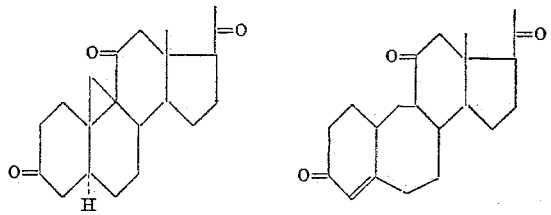

The isomerisation according to the present invention is quite unexpected since it is known that 1:1:2:2-tetrasubstituted cyclopropane rings on reaction with acids are opened up between carbon atoms 1 and 3, or 2 and 3, with formation of a methyl group:
In contradistinction thereto, in the case of the present

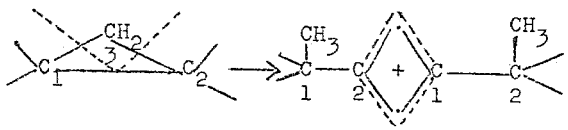

starting materials, the bond between carbon atoms 1 and 2 is broken.

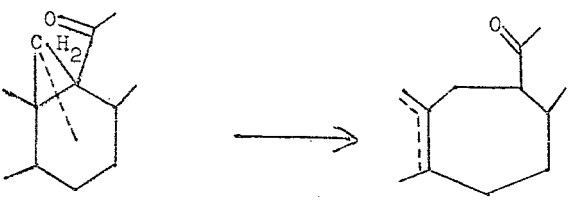

The conversion of the 11-oxo-9β:19-cyclosteroids into the products of the present process can be carried out with mineral acids, for example hydrochloric, sulfuric or perchloric acid or the like, with strong organic acids such as trifluoroacetic acid, para-toluenesulfonic acid, para-bromobenzenesulfonic acid or the like, or with Lewis acids such as boron trifluoride or aluminium chloride. The reaction according to the invention is performed in a suitable solvent, more especially in an aliphatic acid such, for example, as acetic, propionic, butyric acid or the like, or in a lower aliphatic alcohol such, for example, as methanol, ethanol, butanol, more especially tertiary butanol or tertiary amyl alcohol. Any ketals, enolethers and enamines present are split up during the reaction.

If desired, the 11-oxo-group in the products of the invention may be reduced to the 11-hydroxy group or eliminated under reducing conditions. The reduction of the 11-oxo group to the 11-hydroxyl group is achieved, for example, on treatment with catalytically activated hydrogen or with complex metal hydrides, such as lithium aluminium hydride, sodium borohydride and the like. When a $\Delta^4$-3-keto group is present, it is likewise reduced, but it is easy to regenerate it subsequently by mild oxidation, for example according to Oppenauer. Elimination of an 11-oxo group under reducing conditions preferably follows the procedure described by Wolff-Kishner; before this elimination the other keto groups present in the molecule are protected, for example by conversion into the corresponding ketals.

The 9β:19-cyclo-11-oxosteroids used as starting materials are advantageously manufactured by the processes described in U.S. patent applications Ser. No. 211,103 filed July 19, 1962 by Oskar Jeger et al., now U.S. Patent 3,147,251, and Ser. No. 227,594 filed October 1, 1962, by Oskar Jeger et al. according to which 19-unsubstituted 11-oxosteroids are irradiated with ultra-violet light and the resulting 11β:19-cyclo-11α-hydroxy compounds are converted into the corresponding 11-oxo-19-hydroxysteroids by being treated with lead tetraacetate. The last-mentioned substances yield the desired 9β:19-cyclo-11-oxosteroids on esterification of the 19-hydroxy group with a sulfonic acid and treatment with a basic agent.

As starting materials for use in the present process there are particularly suitable 9β:19-cyclo-11-oxosteroids of the androstane, pregnane, cholane, cholestane, spirostane and cardanolide series, as well as triterpenes of the type of 11-oxo-cyclo-artenol. They may contain further substituents, for example in one or several of the positions 2, 4 6, 7, 8, 12, 14, 15, 16, 17, 18, 21 or in the side chain such, for example, as alkyl (for example, lower alkyl) groups such as methyl groups or unsaturated aliphatic hydrocarbon residues such, for example, as ethinyl groups; free or protected (that is to say esterified or etherified) hydroxyl groups; free or functionally converted keto groups such, for example, as ketals, enamines, enolethers or the like, and halogen atoms. The compounds may further contain one or several double bonds, for example in ring D or in the side chain.

Specific starting materials are:

3:20-diethylenedioxy-11-oxo-9β:19-cyclo-5α-pregnane,
3:11:20-trioxo-9β:19-cyclopregnane,
3:11:20-trioxo-21-acyloxy-9β:19-cyclopregnane,
3:17-diethylenedioxy-11-oxo-9β:19-cycloandrostane,
3:11:17-trioxo-9β:19-cycloandrostane,
3:11-dioxo-17β-hydroxyandrostane,
3:11-dioxo-17β-acyloxy-9β:19-cycloandrostane,
3:11-dioxo-17β-acyloxy-17α-methyl-9β:19-cycloandrostane;

furthermore $\Delta^{24}$-3:11-dioxo-9β:19-cyclolanostene and
3:11-dioxo-9β:19-cyclospirostane.

From among the new 9:10-seco-9:19-cyclosteroids obtained by the present process special mention deserve those of the pregnane and androstane series containing a $\Delta^4$-3-keto group, in position 17 a 17β-hydroxyl or keto group or an acetone side chain or a free or esterified hydroxyacetone side chain, and in position 17α a lower aliphatic hydrocarbon residue such, for example as a methyl group or a hydroxyl group, and which may be substituted, for example in position 2, 6 or 16, by a methyl group, in position 6 and/or 12 by a halogen atom and in position 11 by an oxo group or a hydroxyl group.

Especially important final products are, for example, such of the Formulae I and II

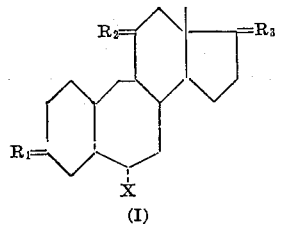

(I)

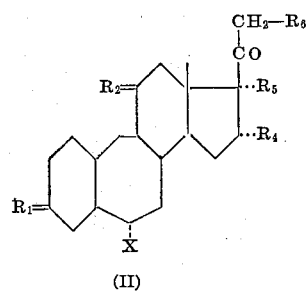

(II)

in which $R_1$ stands for oxo, hydrogen and hydroxy or hydrogen and acyloxy, $R_2$ for hydrogen, oxo, hydrogen and hydroxy or hydrogen and acycloxy $R_3$ for oxo, hydrogen or lower alkly, alkenyl or alkinyl and β-positioned hydroxy or acyloxy, X for hydrogen, methyl, fluorine or chlorine, $R_4$ for hydrogen or methyl and $R_5$ and $R_6$ for hydrogen, hydroxy or acyloxy, and the dehydro derivatives thereof which contain a double bond starting from carbon atom 5 and those of the Formula II which may also contain a double bond starting from carbon atom 16.

Special mention among these compounds deserve the following:

$\Delta^4$-3:11:20-trioxo-9:10-seco-9:19-cyclopregnene,
$\Delta^4$-3:11:20-trioxo-21-hydroxy-9:10-seco-9:19-cyclopregnene and its esters,
$\Delta^4$-3:20-dioxo-9:10-seco-9:19-cyclopregnene, furthermore
$\Delta^4$-3:11:17-trioxo-9:10-seco-9:19-cycloandrostene,
$\Delta^4$-3:11-dioxo-17β-hydroxy-9:10-seco-9:19-cycloandrostene and its esters,
$\Delta^4$-3:11-dioxo-17β-hydroxy-17α-alkyl-9:10-seco-9:19-cycloandrostenes, more especially $\Delta^4$-3:11-dioxo-17β-hydroxy-17α-methyl, -17α-ethyl, -17α-allyl, -17α-methallyl, -17α-ethinyl-9:10-seco-9:19-cycloandrostene, and their esters, and also the corresponding 11-unsubstituted compounds such, for example, as $\Delta^4$-3-oxo-17β-hydroxy-9:10-seco-9:19-cycloandrostene,
$\Delta^4$-3-oxo-17β-hydroxy-17α-methyl-9:10-seco-9:19-cycloandrostene and its esters.

and the corresponding 11β-hydroxy compounds such, for example, as $\Delta^4$-3-oxo-11β:17β-dihydroxy-9:10-seco-9:19-cycloandrostene and its esters, The acid residues in the above-mentioned esters are more especially derived from aliphatic, cycloaliphatic, araliphatic, heterocyclic or aromatic carboxylic acids respectively, preferably those containing 1 to 15 carbon atoms, for example formates, acetates, propionates, butyrates, trimethylacetates, oenanthates, caproates, decanoates, cyclopentylpropionates, valerates, benzoates, furoates, hexahydrobenzoates, phenylpropionates, trifluoroacetates, ethyl carbonates, methyl carbonates and the like.

The products of the present process constitute a new type of steroids containing a 7-membered B-ring; they are pharmacologically active or can be used as intermediates for the manufacture of pharmacologically active steroids.

Inter alia, the new B-homosteroids—which contain the groups required to produce a biological activity in normal steroids—possess the same pharmacodynamic properties: inter alia, for example, the B-homosteroids of the androstane and pregnane series specifically mentioned above have an anabolic, androgenic gestagenic or anti-inflammatory, hypotenisve and sodiuretic effect. When a product of the invention does not contain the above-mentioned groups required to produce a biological effect, such groups can be introduced into the product in known manner. Thus, for example, a 3-hydroxyl group can be converted into an oxo group and in compounds that contain a long side chain—such, for example, as the cholestane or spirostane compounds—said side chain can be degraded to the hydroxyacetone side chain or to a hydroxyl or oxo group.

The following examples illustrate the invention.

*Example 1*

70 mg. of 3:11:20-trioxo-9β:19-cyclo-5α-pregnane in 10 cc. of glacial acetic acid and 1.5 cc. of concentrated hydrochloric acid are refluxed for 30 minutes. The solution is then poured into water and the whole is extracted with ether. The organic phase is washed with sodium bicarbonate solution and then with water, dried over anhydrous sodium sulfate and evaporated under vacuum to yield 60 mg. of crude product which displays in the ultra-violet absorption spectrum a maximum at 242 mμ (ε=9450). An ethereal solution of this product is filtered through neutral alumina (activity II), to yield 50 mg. of crystals which after two recrystallisations from a mixture of methylene chloride, ether and petroleum ether melt at 140 to 141° C. Ultra-violet absorption spectrum in ethanol:$\lambda_{max}$=242 mμ (ε=12,500). Infra-red spectrum in chloroform: bands at 1710, 1670 and 1625 cm.$_{-1}$. Nuclear magnetic resonancespectrum (6 mg. in 0.3 cc. of deuterochloroform): δ=5.97/broad singlet; 2.13/singlet; 0.61/singlet. Optical rotation $[\alpha]_D = +169.4°$ (c.=0.91 in chloroform).

The product thus obtained is $\Delta^4$-3:11:20-trioxo-9:10-seco-9:19-cyclopregnene.

The 3:11:20-trioxo-9β:19-cyclo-5α-pregnane used as starting material can be prepared as follows:

100 mg. of 3:20-diethylenedioxy-11-oxo-9β:19-cyclo-5α-pregnane [prepared by the process described in the aforementioned patent application Ser. No. 227,594] are heated in 2 cc. of glacial acetic acid, 2 cc. of methanol and 5 drops of water for 1½ hours at 60° C. and then allowed to cool. The solution is taken up in ether and the organic phase is washed with sodium bicarbonate solution and then with water. The ethereal solution is dried over anhydrous sodium sulfate and evaporated, to yield 70 mg. of crystals having a constant melting point of 163.5 to 164° C. after having been twice recrystallised from acetone+petroleum ether. Optical rotation $[\alpha]_D = +165°$ (c.=0.42 in chloroform). Infrared spectrum in carbon tetrachloride: bands at 1714 and 1683 cm.$^{-1}$. Nuclear magnetic resonance spectrum (18 mg. in 0.3 of a 1:1-mixture of deuterochloroform and carbon tetra-chloride): δ=2.88/doublet/I=15 cycles; 2.11/singlet; 0.70/doublet/I=about 0.8 cycle. The product is 3:11:20-trioxo-9β:19-cyclo-5α-pregnane.

*Example 2*

A solution of 100 mg. of 3:11-dioxo-17β-acetoxy-17α-methyl-9β:19-cyclo-5α-androstane in 10 cc. of glacial acetic acid and 1.5 cc. of concentrated hydrochloric acid is refluxed for 50 minutes. The cooled reaction mixture is poured into water, taken up in ether, and the ethereal solution is washed with sodium bicarbonate solution and then with water until the washings run neutral, dried and evaporated. The resulting crude $\Delta^4$-3:11-dioxo-17α-methyl-17β-acetoxy-9:10-seco-9:19-cycloandrostene (absorption maximum in ultra-violet at 243 mμ [ε=9600]) is purified by chromatography on alumina.

In identical manner 3:11-dioxo-17β-acetoxy-9β:19-cyclo-5α-androstane yields Δ⁴-3:11-dioxo-17β-acetoxy-9:10-seco-9:19-cycloandrostene which, in its turn, is converted by alkaline hydrolysis into the corresponding free 17β-hydroxy compound.

The 9β:19-cyclo compounds used as starting materials can be prepared from 3-ethylenedioxy-11-oxo-17α-methyl-17β-acetoxy-5α-androstane and 3-ethylenedioxy-11-oxo-17β-acetoxy-5α-androstane respectively by the processes described in the afore-mentioned patent applications Ser. No. 211,103 and Ser. No. 227,594 by irradiation, subsequent treatment with lead tetraacetate, mesylation of the 19-hydroxy group, alkaline treatment, subsequent further acetylation of the partially hydrolysed 17β-acetoxy group and deketalisation in position 3.

What is claimed is:

1. A member selected from the group consisting of compounds having the formulae

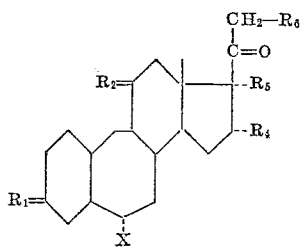

and

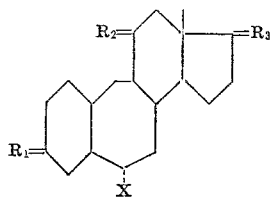

in which $R_1$ represents a member selected from the group consisting of oxo, hydrogen together with hydroxy and hydrogen together with acyloxy, $R_2$ represents a member selected from the group consisting of hydrogen, oxo, hydrogen together with hydroxy and hydrogen together with acyloxy, X represents a member selected from the group consisting of hydrogen, methyl, fluorine and chlorine, $R_3$ represents a member selected from the group consisting of oxo,

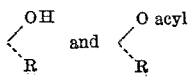

in which R represents a member selected from the group consisting of hydrogen, lower alkyl, lower alkenyl and lower alkinyl, $R_4$ represents a member selected from the group consisting of hydrogen and methyl and $R_5$ and $R_6$ each represent a member selected from the group consisting of hydrogen, hydroxy and acyloxy, the 4-dehydro-derivatives of the 3-oxo compounds and the 5(10)-dehydro derivatives of the compounds containing a hydrogen atom in the 3-position, said acyl groups being derived from carboxylic acids containing up to 15 carbon atoms said carboxylic acids being selected from the group consisting of alkane-carboxylic acids, cycloalkane-carboxylic acids, benzoic acid, benzene-lower alkane-carboxylic acids, furoic acid and trifluoroacetic acid.

2. Δ⁴-3,11-dioxy-17β-acetoxy-9,10 - seco - 9,19-cycloandrostene.

3. Δ⁴-3,11 - dioxy - 17β-acetoxy-17α-methyl-9,10-seco-9,19-cyclo-androstene.

4. Δ⁴-3,11,20-trioxo-9,10-seco-9,19-cyclo-pregnene.

5. Δ⁴-3,11,20 - trioxo-21-hydroxy-9,10-seco-9,19-cyclopregnene.

6. Δ⁴-3,11,17-trioxo-9,10-seco-9,19-cyclo-androstene.

7. Δ⁴-3,11 - dioxo - 17β-hydroxy-9,10-seco-9,19-cycloandrostene.

8. Δ⁴-3,11-dioxo-17β-hydroxy-17α-methyl-9,10 - seco-9,19-cyclo-androstene.

9. Process for the manufacture of a member selected from the group consisting of Δ⁴-3,11-dioxo-9,10-seco-9,19-cyclo-steroids, Δ⁵⁽¹⁰⁾ - 3 - hydroxy-11-oxo-9,10-seco-9,19-cyclo-steroids and Δ⁵⁽¹⁰⁾-3-acyloxy-11-oxo-9,10-seco-9,19-cyclo-steroids unsubstituted in 1- and 5-position, wherein a 3-R-11-oxo-9β,19-cyclo-steroid in which R represents a member selected from the group consisting of oxo, lower alkylenedioxy, hydrogen together with hydroxy and hydrogen together with acyloxy, which is unsubstituted in 1- and 5-position and saturated in 5-position, and said acyl radicals are derived from carboxylic acids containing up to 15 carbon atoms, is treated with an acid selected from the group consisting of a mineral acid, a strong organic acid and a Lewis-acids in a solvent.

References Cited by the Examiner

UNITED STATES PATENTS

| 3,040,093 | 6/1962 | Muller | 260—488 |
| 3,059,019 | 10/1962 | Ringold | 260—586 X |
| 3,061,636 | 10/1962 | Muller | 260—488 |
| 3,076,023 | 1/1963 | Kaspar | 260—488 |

OTHER REFERENCES

Wagner: Synthetic Organic Chemistry, pages 5–7 and 149–152, (1953).

LORRAINE A. WEINBERGER, *Primary Examiner.*

LEON ZITVER, *Examiner.*